July 5, 1949.  E. W. RISTOW  2,475,518
TORQUE RELEASE TOOL FOR SCREW THREADED UNITS
Filed June 3, 1946
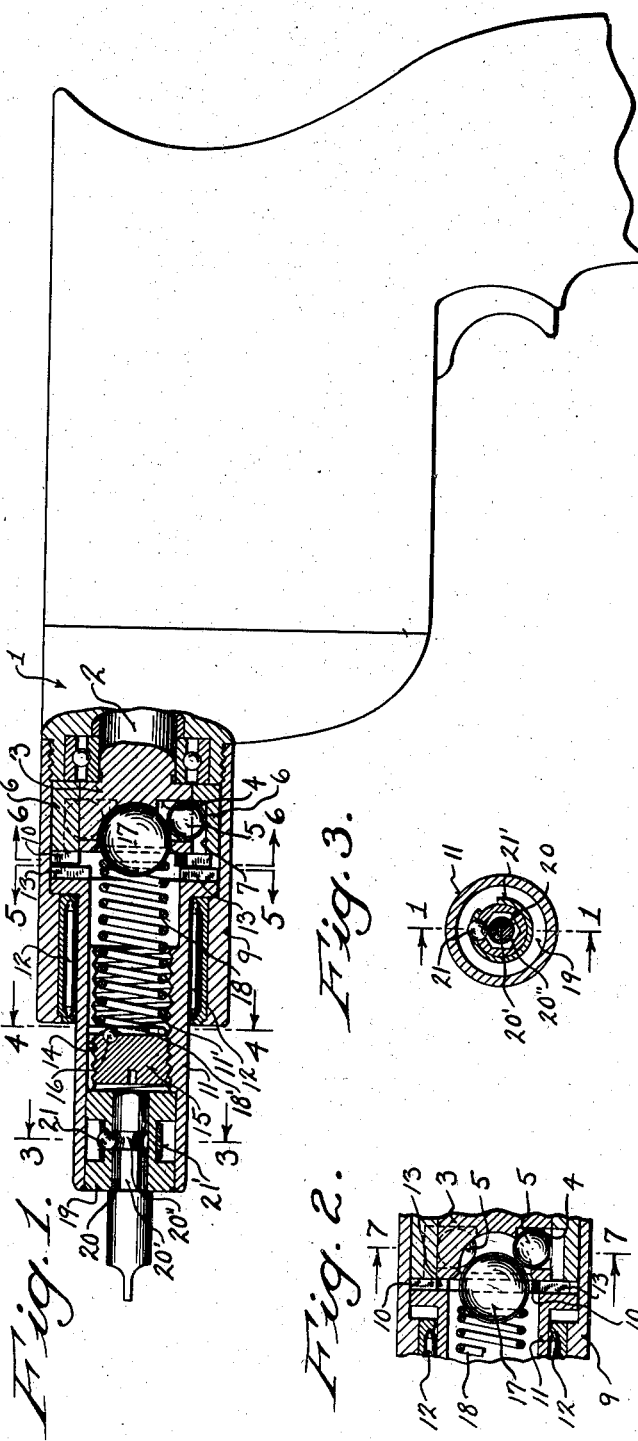
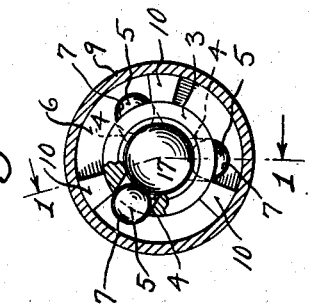
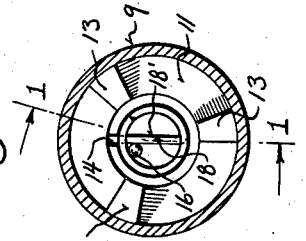
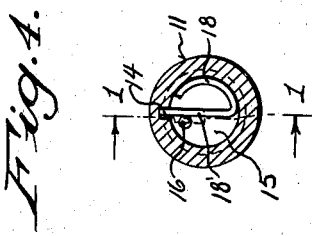
INVENTOR
EDWARD W. RISTOW
BY
ATTORNEYS Patented July 5, 1949

2,475,518

UNITED STATES PATENT OFFICE 2,475,518

TORQUE RELEASE TOOL FOR SCREW-THREADED UNITS

Edward W. Ristow, Milwaukee, Wis., assignor to Milwaukee Electric Tool Corporation, Milwaukee, Wis.

Application June 3, 1946, Serial No. 674,110

2 Claims. (Cl. 279—75)

My invention refers to power driven screw drivers of the male or female type. The general object is to provide an adjustable torque or overload release for the tool or bit for actuating threaded units, such as screws, bolts and nuts of all types, whereby when a predetermined torque force of greater or less degree is reached, the power drive is cut off.

A further object of my invention is to provide a torque release clutch for controlling the drive of the tool from a power actuated spindle.

A further object of my invention is to provide a power driven spindle with a cupped or recessed head having radial apertures carrying loosely mounted clutch balls therein, engageable with a spring controlled master ball or conically nosed plug, whereby spring pressure exerted upon the master ball will force and maintain the clutch balls in pockets formed in a sleeve, journaled on said recessed head, to effect clutching.

With the above and other objects in view, which will appear as the description proceeds, the invention resides in the novel construction, combination and arrangement of parts, substantially as hereinafter described, and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

In the drawings:

Fig. 1 represents a screw driver embodying the features of my invention, the same being broken away and in section as indicated by lines 1—1 of Figs. 3 to 6 inclusive.

Fig. 2 is a fragmentary longitudinal sectional view illustrating the torque release clutch balls in their disengaged position.

Fig. 3 is a cross section through the tool and keyed coupling, the section being indicated by line 3—3 of Fig. 1.

Fig. 4 is another cross sectional view, as indicated by line 4—4 of Fig. 1.

Fig. 5 is another cross sectional view through the mechanism, the section being indicated by line 5—5 of Fig. 1.

Fig. 6 is a further cross sectional view through the same illustrating the ball clutch in its functioning position, the section being indicated by line 6—6 of Fig. 1; and Fig. 7 is a further cross sectional view illustrating the clutch balls in a disengaged position, the section being indicated by line 7—7 of Fig. 2.

Referring by characters to the drawings, 1 indicates the shell of any type of screw driver, having journaled therein a driven spindle 2.

The end of the spindle carries a recessed head 3 having radial openings 4 therein for the reception of driving balls 5. Rotatably mounted upon the head is a sleeve-collar 6. The internal bore of the sleeve-collar is provided with channeled semi-circular pockets 7 for the reception of the driving balls 5, the said balls being seated in the head apertures 4.

The sleeve-collar 6 is encased in a housing 9, the rear end of which housing is in threaded union with the shell 1. The outer face of the sleeve-collar is provided with abrupt cornered radial clutch teeth 10, as best indicated in Figs. 1, 2 and 6 of the drawings.

Rotatably mounted in the front end of the housing is an end flanged sleeve 11, which sleeve projects beyond the end of the housing, being journaled upon needle rollers 12 carried by said housing. The inner flanged end of the sleeve has projecting from its face radially disposed clutch teeth 13, which clutch teeth, under certain conditions, engage the corresponding clutch teeth 10 of the sleeve-collar 6.

The inner surface of the sleeve 11 is formed with a longitudinal section of screw threads 11', and said screw threaded section is interrupted by a spline 14, as best indicated in Figs. 1 and 4 of the drawings.

An adjustable plug 15 is in threaded connection with the internal threads of the sleeve and the inner face of this plug has burred therein a ball 16, which ball forms a fixed projection. The spherical recess of the head 3 has loosely mounted therein a master ball 17, between the outer face of which ball and the inner face of the plug 15 there is interposed a coil spring 18.

A straight end leg 18'' of the spring is seated upon the inner face of the plug and the terminal end of the leg 18' engages the sleeve spline 14. Owing to this spring assemblage, the tension of the same may be finely adjusted, to vary the pressure upon the master ball by rotation of the plug 15.

It will be noted in the rotation of this plug, the projecting ball element 16 will ride under the spring leg 18' in each half revolution of the plug. Hence, the leg and projecting ball 16 serve as a lock for the plug 15 to thus firmly hold said plug in its various adjusted positions.

While I have illustrated and described a master ball for controlling the driving balls 5, I may, in some instances, substitute therefor a cam headed plug of the conical or spherical type.

Brazed or otherwise secured to the mouth of the sleeve 11 is an annularly recessed or undercut keyed coupling 19, as indicated in Figs. 1 and 3 of the drawings. The keyed coupling is provided with a polygonally shaped aperture 20 for the reception of the shank 20' of a screw driver tool. Hence, it will be noted, when the screw driver tool is removed, any standard screw driver may be inserted through said aperture for engagement with the kerf of the adjusting plug 15, whereby said plug is conveniently rotated to vary the pressure of the coil spring upon the back face of the master ball.

The shank of the screw driver tool is formed with an annular recess 20'' for the reception of a ball 21 which extends through an aperture in the coupling 19 and is pressed inwardly by a circular spring 21'. This coupling connection, however, forms no part of my invention, it simply being a means for frictionally holding the tool shank within the coupling.

From the foregoing description, in operation the spindle is normally in rotation. The tension spring 18 exerts a force on the ball 17 and an equal force on the screw plug 15, which force is transmitted through the threads 11' to effect the engagement of the sleeve flange and housing shoulder annular surfaces. Thus, normally, jaws 10 and 13 are not engaged, enabling the operator to rotate the tool carrying sleeve 11 by hand to effect the proper mating of the tool 20' and the work (not shown), this without shutting off his source of power.

The spring pressure on the master ball 17 resolves itself radially and equally against balls 5, which may be three or more in number, causing said balls to enter semicircular pockets 7, whereupon sleeve-collar 6 and head 3 are driven as a unit.

From the foregoing description, when the machine is put into use, the end chisel face of the tool 20 is inserted into the kerf of a screw (not shown) either of the wood or machine type. The device is then given a slight depression movement in actual alignment with the screw head. This action will cause the housing and associated parts to move downward, in opposition to the coil spring, whereby the teeth of the sleeve-collar and sleeve will be intermeshed to effect a positive locking between these parts.

It is understood, in the above referred to operation, the master ball, being in engagement with the balls 5, will radially force said balls into the sleeve-collar semicircular pockets 7, as best shown in Figs. 1 and 6 of the drawings, whereby a positive clutch connection is effected to cause rotation of the screw driver tool, which rotation will continue until such time as the head of the screw has exerted the desired tension or downward pressure upon the screw. When this desired pressure is exerted, the coil spring, being properly adjusted as to tension, will yield under overload force. This yielding resisting force is due to the fact that the circular pockets in the sleeve-collar will force the balls 5 inwardly, upon further rotation of said spindle. The balls will thus roll towards the center of the head and, in so doing, will force the master ball 17 outwardly, whereby said balls will radially contract until their outer surfaces are aligned with the outer circumference of the head, to thus free the clutch connection between the power spindle and sleeve, as best shown in Figs. 2 and 7 of the drawings, whereby the screw driver tool will come to a stop.

This breaking connection between the tool and the driving power will be determined by the tension set for the coil spring. Hence, the screw element may be accurately given the desired tightening seat pressure, which pressure is entirely automatic.

While I have shown and described the mechanism as it applies to a portable hand tool of the air or electric type, it is apparent that the device may be applied to any source of rotating power such as a drill press or flexible shaft. It is also obvious that the screw driving tool may be either of the male or female type.

While I have specifically described a positive clutch connection between the sleeve-collar and sleeve, in some instances this clutch connection may be dispensed with. The parts comprising the collar and sleeve may be a single unit. It is also obvious that the rotation of the screw driver tool may be reversed for extracting screw members.

I claim:
1. A torque release clutch comprising a centrally recessed driven head having radial apertures therein, a toothed sleeve-collar rotatably mounted upon the head, pockets in the sleeve-collar, clutch balls mounted in the head apertures engageable with the sleeve-collar pockets, a cam member loosely mounted in the recessed head engageable with the clutch balls, a flange tooth-carrying sleeve engageable with the sleeve-collar teeth, and a tension spring engaging the master ball.

2. A torque release clutch comprising a centrally recessed driving head having apertures therein, a sleeve-collar rotatably mounted thereon, pockets in the sleeve-collar, clutch balls mounted in the head apertures engageable with the sleeve-collar pockets, a cam member mounted in the head recess engageable with the clutch balls, and an adjustable tension spring engaging the cam member.

EDWARD W. RISTOW.

REFERENCES CITED

The following references are of record in the file of this patent:

UNITED STATES PATENTS

| Number | Name | Date |
|---|---|---|
| 1,566,553 | Maisch | Dec. 22, 1925 |
| 1,789,559 | Meunier | Jan. 20, 1931 |